US008290500B2

(12) United States Patent
Pettersson et al.

(10) Patent No.: US 8,290,500 B2
(45) Date of Patent: Oct. 16, 2012

(54) METHOD AND ARRANGEMENT FOR COMPUTING AT A BASE STATION A DELAY TIME FOR DATA FROM A TERMINAL BUFFER

(75) Inventors: Jonas Pettersson, Luleå (SE); Kristofer Sandlund, Luleå (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/148,361

(22) PCT Filed: Feb. 9, 2009

(86) PCT No.: PCT/SE2009/050131
§ 371 (c)(1),
(2), (4) Date: Aug. 8, 2011

(87) PCT Pub. No.: WO2010/090566
PCT Pub. Date: Aug. 12, 2010

(65) Prior Publication Data
US 2011/0306351 A1    Dec. 15, 2011

(51) Int. Cl.
*H04W 72/00* (2009.01)
(52) U.S. Cl. .......... 455/450; 455/561; 455/456.5; 455/438; 370/252; 370/352; 370/230
(58) Field of Classification Search .......... 455/418–419, 455/466, 461, 551, 566, 550.1, 556.2, 557; 370/263–271
See application file for complete search history.

(56) References Cited

U.S. PATENT DOCUMENTS

| 7,457,282 | B2 | 11/2008 | Mallila | |
|---|---|---|---|---|
| 2005/0094622 | A1* | 5/2005 | Mallila | 370/352 |
| 2006/0246847 | A1* | 11/2006 | Kim et al. | 455/69 |
| 2008/0267084 | A1* | 10/2008 | Li et al. | 370/252 |

FOREIGN PATENT DOCUMENTS

| EP | 1 710 963 A1 | 10/2006 |
|---|---|---|
| EP | 1 890 422 A2 | 2/2008 |

OTHER PUBLICATIONS

International Search Report, PCT Application No. PCT/SE2009/050131, Nov. 3, 2009.
Talucci et al. "MACA-BI (MACA By Invitation) A Receiver Oriented Access Protocol for Wireless Multihop Networks" *The 8th IEEE International Symposium on Personal, Indoor and Mobile Radio Communications, Waves of the Year*, vol. 2, Sep. 1-4, 1997, pp. 435, 439.

* cited by examiner

*Primary Examiner* — Marcos Batista
*Assistant Examiner* — Keith Fang
(74) *Attorney, Agent, or Firm* — Myers Bigel Sibley & Sajovec, P.A.

(57) ABSTRACT

Method and arrangement in a base station for computing a delay time parameter of data in a buffer of a terminal. The base station and the terminal are within a wireless communication system. The terminal buffer is arranged to comprise frames, which frames in turn are arranged to comprise data. The method comprises determining a service requested by the terminal, estimating the arrival time of the last frame comprising transmit data to be received from the terminal, estimating the number of frames comprised in the buffer of the terminal, establishing a frame interval according to the determined service and estimating the arrival time of the oldest frame in the terminal buffer by subtracting, from the estimated arrival time of the last received frame comprising transmit data, one established frame interval for each frame the terminal buffer is estimated to comprise, additional to the oldest frame.

4 Claims, 5 Drawing Sheets

METHOD AND ARRANGEMENT FOR COMPUTING AT A BASE STATION A DELAY TIME FOR DATA FROM A TERMINAL BUFFER

TECHNICAL FIELD

The present invention relates to a method and arrangement in a wireless communication system and, more in particular, to a mechanism for uplink delay scheduling.

BACKGROUND

In the 3rd Generation Partnership Project (3GPP), work is ongoing on specifications of the UMTS Terrestrial Radio Access Network (UTRAN) evolution (E-UTRA) as part of the Long Term Evolution (LTE) effort.

Studies show that it is advantageous to schedule Voice over Internet Protocol (VoIP) users based on the time that packets have waited in the scheduler buffers. This is known as delay scheduling. It is well known how to do this in the downlink where the scheduler has access to the transmission buffers.

The radio downlink is the transmission path from a base station, e.g. an eNodeB to a terminal, or a User Equipment (UE) as the terminal also may be referred to as. The uplink is the inverse of a downlink, i.e. the transmission path from the terminal to the base station.

No information about the queuing delay in the terminal is available in the uplink scheduler. This information can however be explicitly signalled from the terminal to the scheduler.

In LTE, scheduling is modelled in the Medium Access Control (MAC) layer and resides in the eNodeB. The scheduler assigns radio resources, also called Resource Blocks (RB), for the downlink (assignments) as well as for the uplink (grants) using the Physical Downlink Control Channel (PD-CCH).

For uplink scheduling, the eNodeB needs information about the current state of the buffers in the terminal, i.e. if and how much data the terminal has in its priority queues. This information is sent from the terminal to the eNodeB either as a 1-bit Scheduling Request (SR) or by a Buffer Status Report (BSR). The Scheduling Requests are transmitted on a control channel such as e.g. Physical Uplink Control CHannel (PUCCH) or Radio Access CHannel (RACH) while the BSR are transmitted on the data channel such as e.g. Physical Uplink Shared CHannel (PUSCH), mostly together with user data.

The problem with the existing solution is that explicit signalling of delay information is costly in terms of resource usage, which leads to lower capacity and/or coverage. Also, scheduling principles that do not take delay into account perform worse than ones that do.

SUMMARY

It is the object to obviate at least some of the above disadvantages and provide an improved performance within a wireless communication system.

According to a first aspect, the object is achieved by a method in a base station for computing a delay time parameter of data comprised in a buffer of a terminal. The base station and the terminal are comprised within a wireless communication system. The terminal buffer is arranged to comprise frames, which frames in turn are arranged to comprise data. The method comprises determining a service requested by the terminal. Also, the method comprises estimating the arrival time of the last frame comprising transmit data to be received from the terminal. Further, the method also comprises estimating the number of frames comprised in the buffer of the terminal. Further yet, the method additionally comprises establishing a frame interval according to the determined service. In addition, the method further comprises estimating the arrival time of the oldest frame in the terminal buffer by subtracting, from the estimated arrival time of the last frame comprising transmit data, one established frame interval for each frame the terminal buffer is estimated to comprise, additional to the oldest frame.

According to a second aspect, the object is also achieved by an arrangement in a base station for computing a delay time parameter of data comprised in a buffer of a terminal. The base station and the terminal are comprised within a wireless communication system. The terminal buffer is arranged to comprise frames, which frames in turn are arranged to comprise data. The arrangement comprises a determination unit. The determination unit is adapted to determine a service requested by the terminal. Also, the arrangement comprises a first estimation unit. The first estimation unit is adapted to estimate the arrival time of the last frame comprising transmit data to be received from the terminal. Further, the arrangement also comprises a second estimation unit. The second estimation unit is adapted to estimate the number of frames comprised in the buffer of the terminal. In addition, the arrangement also comprises an establishing unit. The establishing unit is adapted to establish a frame interval according to the determined service. Also, in further addition, the arrangement comprises a third estimation unit. The third estimation unit is adapted to estimate the arrival time of the oldest frame in the terminal buffer by subtracting, from the estimated arrival time of the last frame comprising transmit data, one established frame interval for each frame the terminal buffer is estimated to comprise, additional to the oldest frame.

By estimating the amount of data to be received from the terminal according to the present methods and arrangements, the total amount of signalling between the base station and the terminal may be reduced. As the number of grants that are transmitted within the system limits the number of terminals that may use the system simultaneously, it is possible to increase the load within the system by letting more terminals participate, as less grants has to be sent. By using knowledge about the terminals service related behaviour, it may be determined which state the terminal is transmitting in and at what point in time the terminal has data to send. This information is according to the present method and arrangement used for uplink delay scheduling, leading to higher capacity and coverage of the system. Also better scheduling decisions may be made when delay is taken into account. Further, the overall reduced signalling resulting from the present methods and arrangements, the number of users per cell within the system may be increased. Thereby an improved performance in a communication system is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a base station, which may be put into practice in the embodiments described below. This invention may, however, be embodied in many different forms and should not be construed as limited to the embodiments set forth herein; rather, these embodiments are provided so that this disclosure will be thorough and complete, and will fully convey the scope of the invention to those skilled in the art. It should be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

Figure 1:
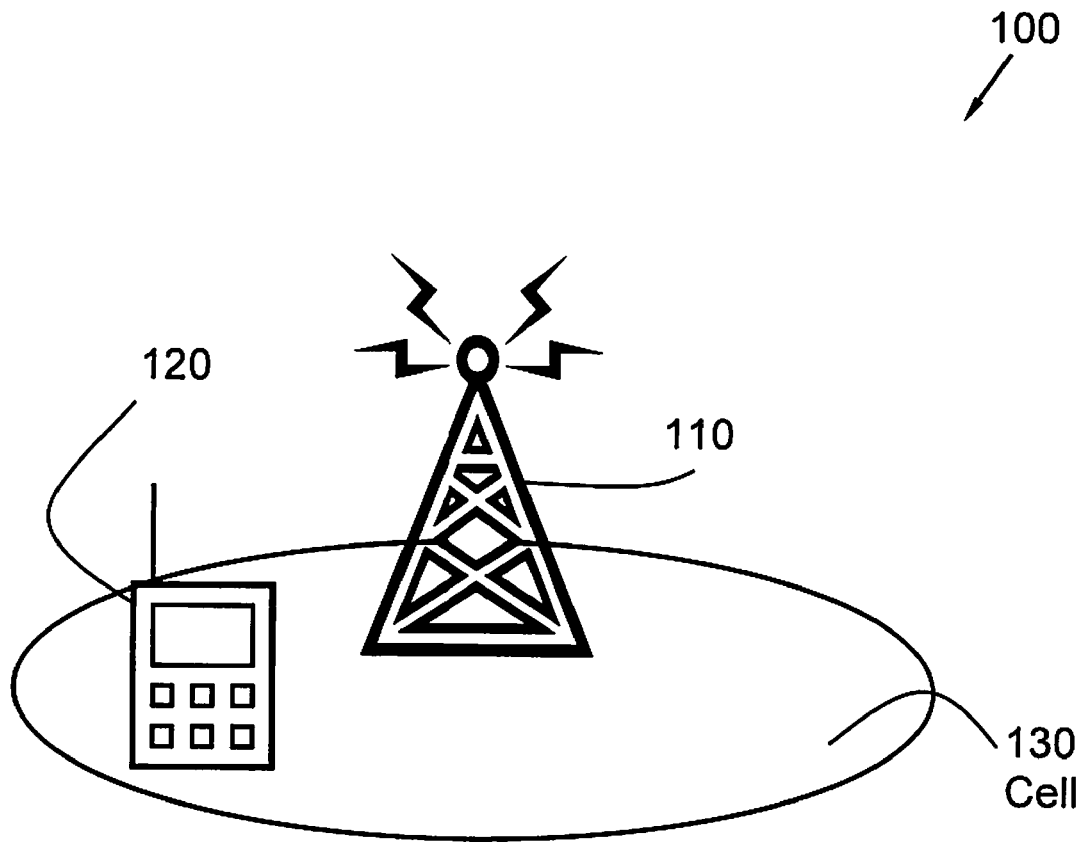
FIG. 1 is a schematic block diagram illustrating a wireless communication system.

FIG. 1 is a schematic illustration over a wireless communication system 100. The wireless communication system 100 comprises at least one base station 110 and is arranged to comprise at least one terminal 120. The base station 110 may send and receive wireless signals to and from the terminal 120 situated within the cell 130.

Figure 2:
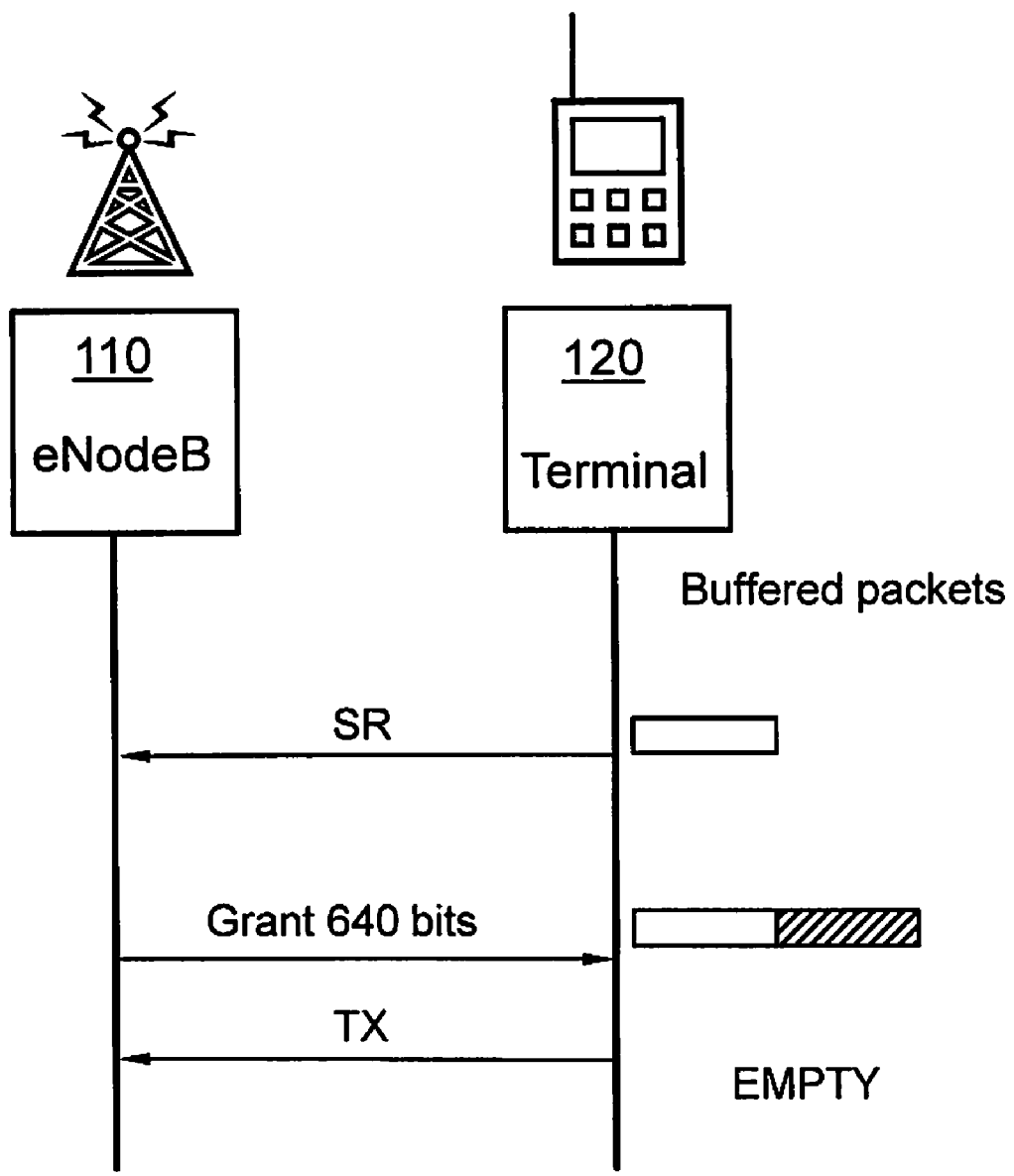
FIG. 2 is a flow chart illustrating scheduling communication according to some embodiments.

Although only one base station 110 is shown in FIG. 2, it is to be understood that another configuration of base station transceivers may be connected through, for example, other network nodes, to define the wireless communication system 100. Further, the base station 110 may be referred to as e.g. a Remote Radio Unit, an access point, a Node B, an evolved Node B (eNode B) and/or a base transceiver station, a Radio Base Station (RBS), Access Point Base Station, base station router, etc depending e.g. of the radio access technology and terminology used.

In some embodiments, the terminal 120 may be represented by a wireless communication device, a wireless communication terminal, a mobile cellular telephone, a Personal Communications Systems terminal, a Personal Digital Assistant (PDA), a laptop, a User Equipment (UE), computer or any other kind of device capable of managing radio resources.

The wireless communication system 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR) High Speed Packet Data Access (HSPA), Universal Mobile Telecommunications System (UMTS) etc, just to mention some few arbitrary and none limiting examples.

Further, as used herein, the wireless communication system 100 may further, according to some embodiments, refer to Wireless Local Area Networks (WLAN), such as Wireless Fidelity (WiFi) and Worldwide Interoperability for Microwave Access (WiMAX), Bluetooth or according to any other wireless communication technology.

It is to be noted however, that the present solution is not in any way limited to be performed exclusively over a radio interface within the wireless communication network 100, but may be performed within a wireless communication system 100 where some nodes are wirelessly connected and some nodes have a wired connection.

The wireless communication system 100 may according to some optional embodiments comprise a control node, depending e.g. on the access technology used. The control node may be e.g. a Radio Network Controller (RNC). The control node is a governing element in the wireless communication system 100, responsible for control of base stations 110, which are connected to the control node. The optional control node may further for example carry out radio resource management; some of the mobility management functions and may e.g. provide modulation information associated with information data to be sent from the base station 110 to the terminal 120, just to mention some brief examples illustrating some possible functionalities of the control node.

The terminal 120 may further communicate with other terminals not shown in FIG. 1, via the base station 110 comprised within the wireless communication system 100.

The base station 110 is further adapted to schedule the uplink transmissions from the terminals 120, to the base station 110. In order to grant a particular terminal 120 access to a particular uplink resource, a grant is sent from the base station 110 to that particular terminal 120, based on the estimated buffer status at the terminal 120, as will be further explained more in detail in connection with FIG. 2.

The expression "downlink" is here used to specify the transmission from the base station 110 to the terminal 120, while the expression "uplink" is used to denote the transmission from the terminal 120 to the base station 110.

FIG. 2 illustrates a mechanism for buffer status estimation, according to some embodiments. The base station 110 may establish a guess for when the first packet has arrived to the buffer of the terminal 120. The guess may be based on knowledge about the service behaviour to guess arrival times and packet sizes. Such knowledge may comprise e.g. that most VoIP codecs have a fixed frame interval of 20 ms when talking. Also, in silent state the frame interval may increase to e.g. 160 ms (AMR). Further it may be assumed e.g. that the packet size may be estimated to be the same as the previous packet. That may also be valid when Robust Header Compression (ROHC) is applied. Further yet, Codec state changes, such as a change from talk state to silence state may be detected by examining the sizes of received packets, according to some embodiments.

According to some embodiments, the arrival time of the last talk frame, T, may be estimated by using the reception of a scheduling request when the terminal buffer was empty as a reference point and then adding one frame interval at a time for each frame interval that passes.

The made computation may be used by the base station 110 as a parameter in order to estimate the arrival time of the oldest packet in the buffer of the terminal 120. Thus the arrival time of the oldest packet may be estimated by firstly estimating the arrival time of the last talk frame and then subtracting one frame interval for each additional frame the buffer is estimated to contain. The delay may then computed by subtracting the oldest arrival time from the current time. This delay may then be used to do scheduling decisions concerning the particular terminal 120, according to some embodiments.

The number of frames that the buffer is estimated to contain, N, may be computed from the estimated size of the buffer, B, by dividing with an expected packet size, S, and rounding up:

$$N = \text{ceiling}(B/S)$$

The delay, D, may then be calculated as:

$$D = T - (N-1) \cdot F$$

where F is the frame interval of the provided service.

According to some embodiments, the number of frames that the buffer is estimated to contain may be computed by increasing a counter, N, every frame interval and decreasing the same counter every time a frame is received by the base station 110. The delay, D, may then calculated as previously described.

The arrival of the last talk frame may further, according to some embodiments be estimated by randomly or with some pattern, sending uplink grants to the terminal 120. If there is a talk frame in the buffer the terminal 120 will transmit data, otherwise only padding.

The arrival time of the last talk frame may then be determined within the interval between one transmission with only padding and a transmission with data, or a scheduling request if the terminal 120 transmits one. This estimate may further be refined by transmitting more grants within the estimated interval, e.g. every recurring frame period. The delay may then be computed as previously discussed.

Figure 3A:
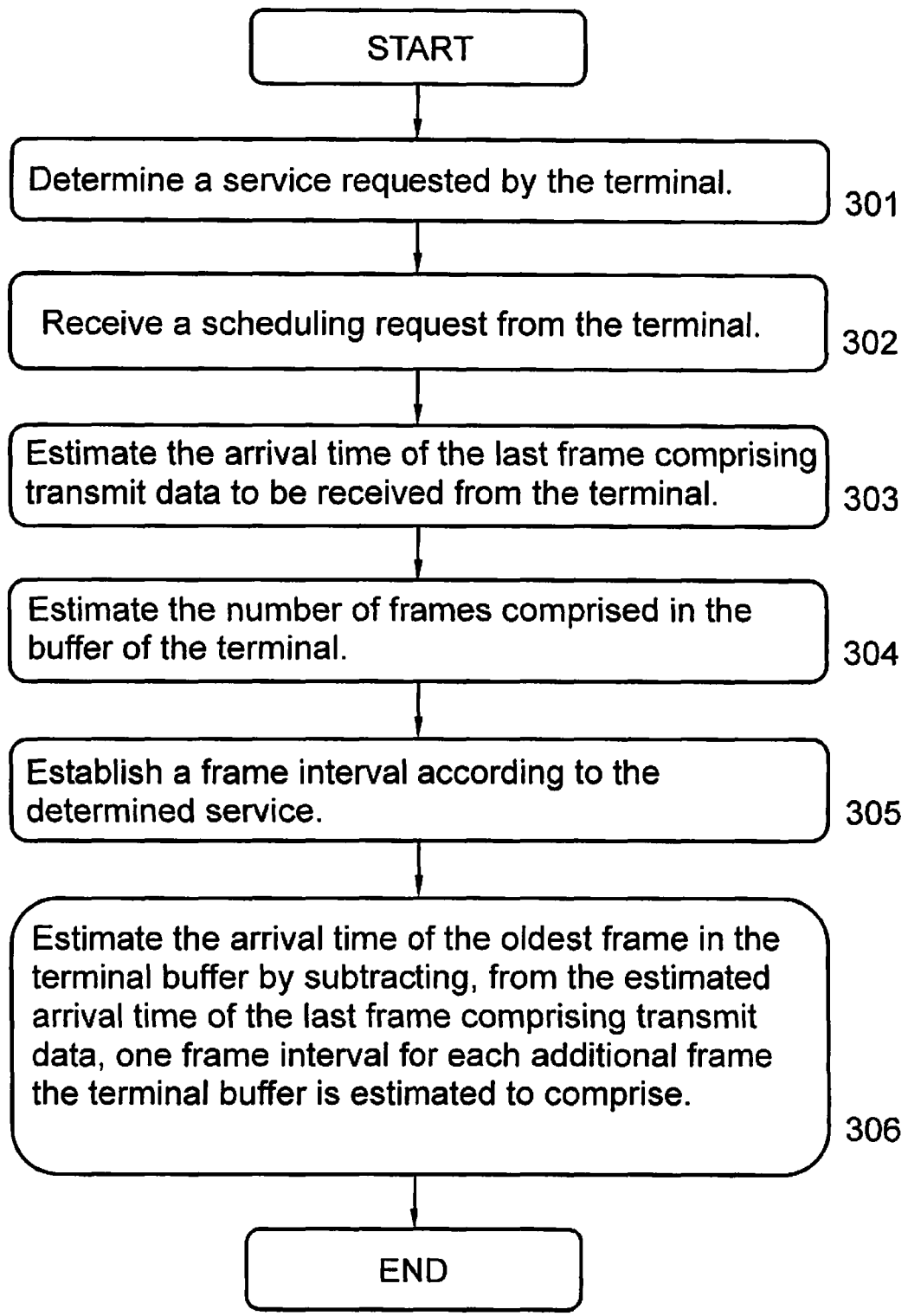
FIG. 3A is a flow chart illustrating embodiments of method steps in a base station.

FIG. 3A is a flow chart illustrating embodiments of method steps 301-306 performed in a base station 110. The method aims at computing a delay time parameter of data comprised in a buffer of a terminal 120. The base station 110 and the terminal 120 are comprised within a wireless communication system 100. The terminal buffer is arranged to comprise frames, which frames in turn are arranged to comprise data.

The method may be performed in any of a first proactive buffer estimation state or a second passive state. The first proactive buffer estimation state may corresponds to the talk codec state. The second passive state corresponds to the silence codec state.

To appropriately compute a delay time parameter of data comprised in a buffer of a terminal 120, the method may comprise a number of method steps 301-306.

It is however to be noted that some of the described method steps 301-306 are optional and only comprised within some embodiments. Further, it is to be noted that the method steps 301-306 may be performed in any arbitrary chronological order and that some of them, e.g. step 301 and step 303, or even all steps may be performed simultaneously or in an altered, arbitrarily rearranged, decomposed or even completely reversed chronological order. The method may comprise the following steps:

Step 301

It is determined which service the terminal 120 requests. According to some embodiments, the service may be e.g. VoIP.

Step 302

This step is optional and may only be performed within some embodiments.

A scheduling request may be received from the terminal 120, according to some embodiments.

Step 303

The arrival time of the last frame comprising transmit data to be received from the terminal 120 is estimated.

According to some embodiments, the estimation of the arrival time of the last frame comprising transmit data, may comprise estimating when, in time, the terminal buffer was empty. Also, a starting point in time based on the transmission time of the received scheduling request when the terminal buffer was estimated to be empty, may be established. Further, one established frame interval at the time, may be added, for each frame interval that passes.

According to some embodiments, the estimation of the arrival time of the last frame may comprise sending a grant to the terminal 120 at a first point in time. Further, a transmission may be received from the terminal 120. Also, it may be determined if the received transmission comprises only padding or transmit data. If the received transmission only comprises padding, that point in time may be set as the lower limit of a time interval within the established frame interval, if it is not lower than a previously set lower limit of the time interval. If the received transmission comprises transmit data, that point in time may be set as the upper limit of a time interval within the established frame interval, if it is not higher than a previously set upper limit of the time interval. It may then be considered that the arrival time of the last frame comprising transmit data has to be situated between the set lower limit and the set upper limit of the time interval. Further, a new grant may be sent to the terminal 120, at a displaced point in time in relation to the first point in time, according to some embodiments. This latter embodiment is further discussed in association with FIG. 3B.

Step 304

The number of frames comprised in the buffer of the terminal 120 is estimated.

According to some optional embodiments, the estimation of frames comprised in the buffer may be performed by obtaining an estimation of the terminal buffer size, estimating the size of a frame to be received from the terminal 120 and dividing the obtained estimation of the buffer size with the estimated size of a frame. The resulting quote may then be selected as an estimate of the number of frames comprised in the terminal buffer if it is an integer. Otherwise the resulting quote may be rounded up to the next integer and that next integer may be selected as an estimate of the number of frames comprised in the terminal buffer.

However, according to some embodiments, the estimation of frames comprised in the buffer may be performed by estimating the number of frames generated by the terminal 120, counting the number of frames received from the terminal 120 and subtracting the number of received frames from the number of frames estimated to be generated by the terminal 120. The resulting integer may then be selected as an estimate of the number of frames comprised in the terminal buffer.

Step 305

A frame interval according to the determined service is established.

Step 306

The arrival time of the oldest frame in the terminal buffer is estimated by subtracting, from the estimated arrival time of the last frame comprising transmit data, one established frame interval for each frame the terminal buffer is estimated to comprise, additional to the oldest frame.

FIG. 3B

Figure 3B:
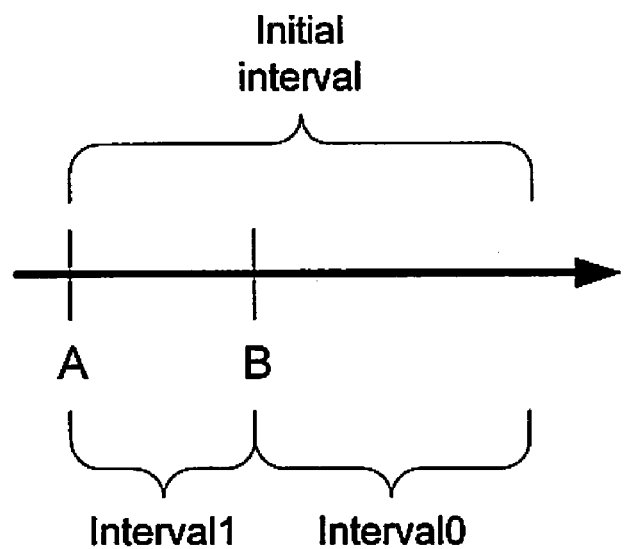
FIG. 3B is an event diagram illustrating embodiments of method steps in a base station.

FIG. 3B illustrates particular embodiments of method steps in a base station 110. At the point A in the FIG. 3B, the buffer of the terminal 120 may be known to be empty. At point B in the FIG. 3B, the terminal 120 transmits a packet, upon receiving a grant from the base station 110 that allows at least one packet. However, if the transmission only comprises padding, i.e. 0 received frames, the frame will arrive in Interval 0. Otherwise i.e. if the transmission comprises at least some data in 1 received frame, the frame will arrive in Interval 1.

FIG. 3C

Figure 3C:
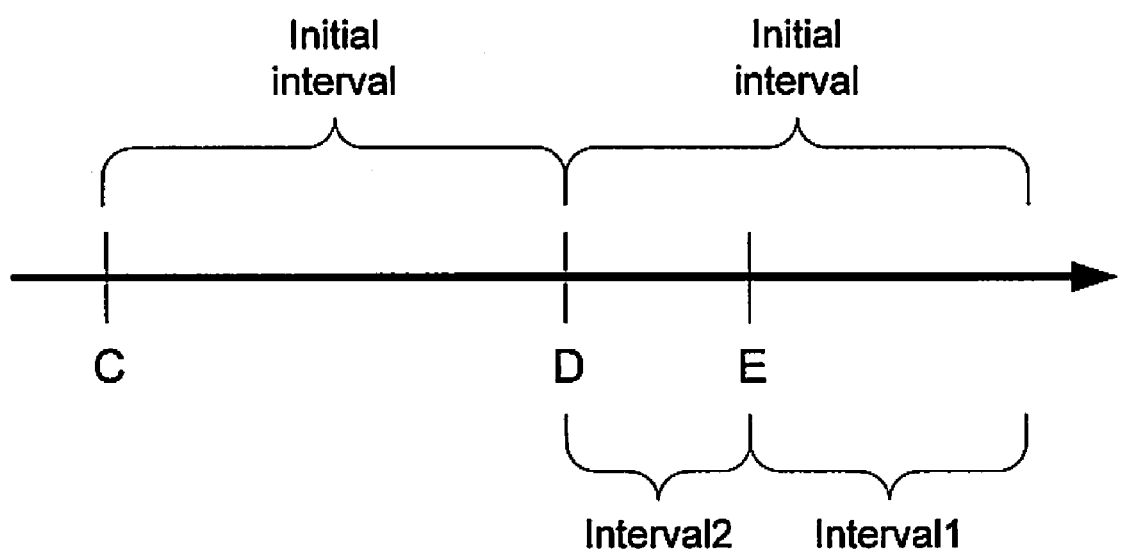
FIG. 3C is an event diagram illustrating embodiments of method steps in a base station.

FIG. 3C illustrates particular embodiments of method steps in a base station 110. It may be known that a frame has arrived between point C and point D, but it has not been transmitted. At point E, the terminal 120 may transmit data, upon receiving a grant that allows more than one packet. If the transmission comprises one frame, a second frame may arrive in Interval 1. Otherwise, if 2 frames are received, the second frame may arrive in Interval 2.

Figure 4:
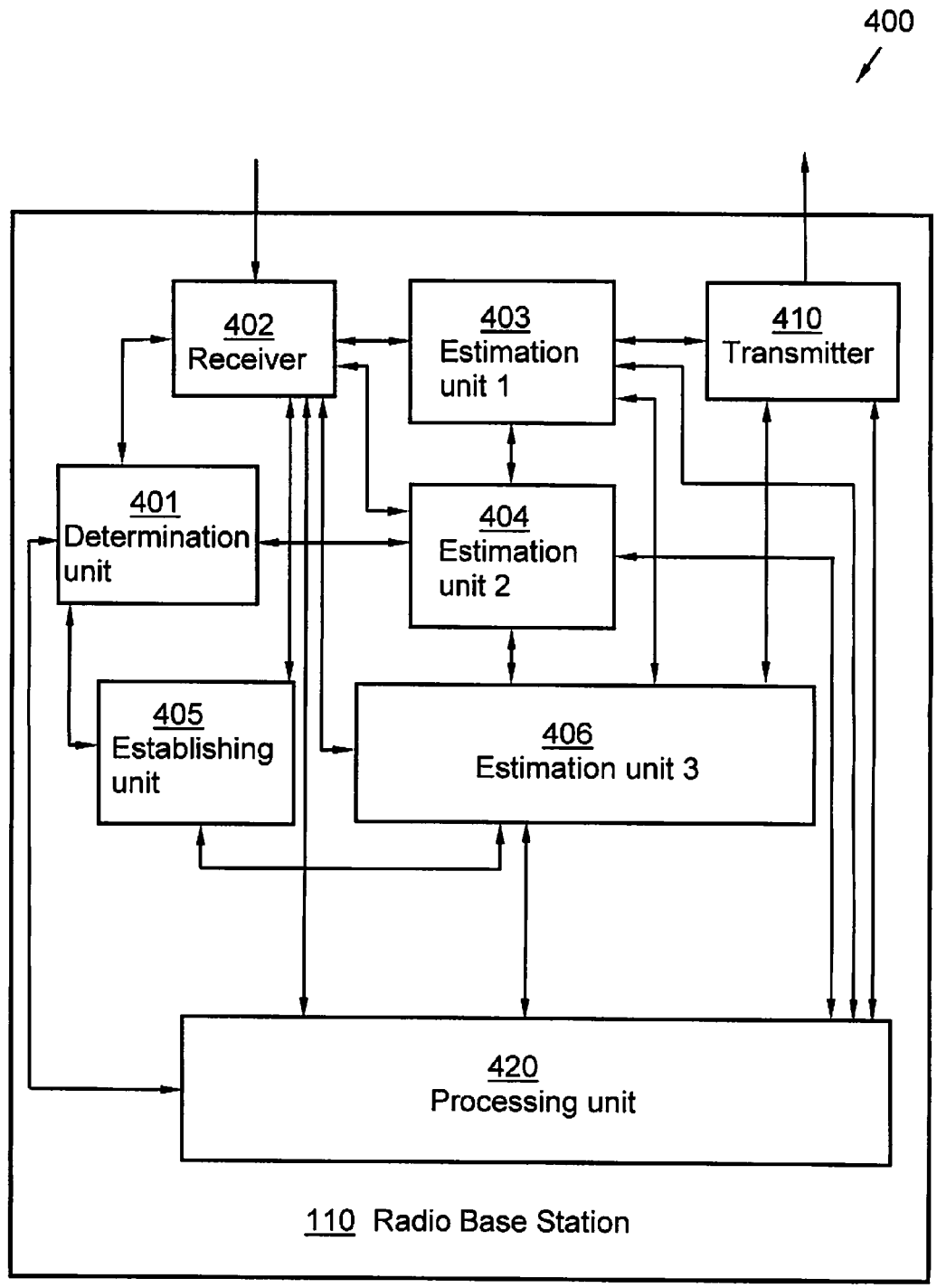
FIG. 4 is a block diagram illustrating embodiments of an arrangement in a base station.

FIG. 4 is a block diagram illustrating embodiments of an arrangement 400 situated in a base station 110. The arrangement 400 is configured to perform the method steps 301-306 for computing a delay time parameter of data comprised in a buffer of a terminal 120. The base station 110 and the terminal 120 are comprised within a wireless communication system 100. The terminal 120 comprises a buffer arranged to buffer frames, which frames in turn are arranged to comprise data For the sake of clarity, any internal electronics of the arrangement 400, not completely necessary for performing the present method has been omitted from FIG. 4.

The arrangement 400 comprises a determination unit 401. The determination unit 401 is adapted to determine a service requested by the terminal 120. Also, the arrangement 400 comprises a first estimation unit 403. The first estimation unit 403 is adapted to estimate the arrival time of the last frame comprising transmit data to be received from the terminal 120. In addition, the arrangement 400 comprises a second estimation unit 404. The second estimation unit 404 is adapted to estimate the number of frames comprised in the buffer of the terminal 120. Further, the arrangement 400 also comprises an establishing unit 405. The establishing unit 405 is adapted to establish a frame interval according to the determined service. In further addition, the arrangement 400 comprises a third estimation unit 406. The third estimation unit 406 is adapted to estimate the arrival time of the oldest frame in the terminal buffer by subtracting, from the estimated arrival time of the last frame comprising transmit data, one established frame interval for each frame the terminal buffer is estimated to comprise, additional to the oldest frame.

The arrangement 400 may further comprise a receiving unit 302. The receiving unit 302 may be adapted to receive a scheduling request from the terminal 120. In addition, the arrangement 400 may comprise a sending unit 410. The sending unit 410 may be adapted to send a grant to the terminal 120.

The arrangement 400 may according to some embodiments further comprise a processing unit 420. The processing unit 420 may be represented by e.g. a Central Processing Unit (CPU), a processor, a microprocessor, or other processing logic that may interpret and execute instructions. The processing unit 420 may perform all data processing functions for inputting, outputting, and processing of data including data buffering and device control functions, such as call processing control, user interface control, or the like.

It is to be noted that the described units 401-420 comprised within the arrangement 400 may be regarded as separate logical entities, but not with necessity as separate physical entities. Any, some or all of the units 401-420 may be comprised or co-arranged within the same physical unit. However, in order to facilitate the understanding of the functionality of the arrangement 400, the comprised units 401-420 are illustrated as separate units in FIG. 4.

Thus the transmitting unit 410 and e.g. the receiving unit 402 may, according to some embodiments, be comprised within one physical unit, a transceiver, which may comprise a transmitter circuit and a receiver circuit, which respectively transmits outgoing radio frequency signals to the terminal 120 and receives incoming radio frequency signals from the terminal 120 via an optional antenna. The antenna may be an embedded antenna, a retractable antenna or any other arbitrary antenna without departing from the scope of the present arrangements. The radio frequency signals transmitted between the base station 110 and the terminal 120 may comprise both traffic and control signals e.g., paging signals/messages for incoming calls, which may be used to establish and maintain a voice call communication with another party or to transmit and/or receive data, such as SMS, e-mail or MMS messages, etc.

Computer program product in the base station 110

The method steps 301-306 in the base station 110 may be implemented through one or more processor units 420 in the base station 110, together with computer program code for performing the functions of the present method steps 301-306. Thus a computer program product, comprising instructions for performing the method steps 301-306 in the base station 110 may compute a delay time parameter of data comprised in a buffer of a terminal 120.

The computer program product mentioned above may be provided for instance in the form of a data carrier carrying computer program code for performing the method steps according to the present solution when being loaded into the processor unit 420. The data carrier may be e.g. a hard disk, a CD ROM disc, a memory stick, an optical storage device, a magnetic storage device or any other appropriate medium such as a disk or tape that can hold machine readable data. The computer program code can furthermore be provided as pure program code on a server and downloaded to the base station 110 remotely, e.g. over an Internet or an intranet connection.

Further, a computer program product comprising instructions for performing at least some of the method steps 301-306 may be used for implementing the previously described method in the base station 110 for computing a delay time parameter of data comprised in a buffer of a terminal 120, when the computer program product is run on a processing unit 420 comprised within the base station 110.

The present invention may be embodied as a method and an arrangement in a radio base station 110, and/or computer program products. Accordingly, the present invention may take the form of an entirely hardware embodiment, a software embodiment or an embodiment combining software and hardware aspects all generally referred to herein as a "circuit". Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices etc.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. Method in a base station for computing a delay time parameter of data comprised in a buffer of a terminal, the base station and the terminal are comprised within a wireless communication system, the terminal buffer is arranged to comprise frames, and the frames comprise data, the method comprises the steps of:

determining a service requested by the terminal;
estimating an arrival time of the last frame of data to be received from the buffer of the terminal;
estimating a number of frames comprised in the buffer of the terminal;
establishing a frame interval according to the determined service; and
estimating the arrival time of the oldest frame in the terminal buffer by subtracting, from the estimate of the arrival time of the last frame of data, one established frame interval for each of the number of frames estimated to be comprised in the buffer of the terminal, additional to the oldest frame,
wherein the step of estimating the number of frames comprised in the buffer of the terminal comprises:
estimating a size of the terminal buffer;
estimating a size of a frame to be received from the terminal;
dividing the estimate of the size of the terminal buffer by the estimate of the size of the frame to generate a result value; and
selecting the result value as an estimate of the number of frames comprised in the terminal buffer in response to the result value being an integer, and, when the result value is not an integer, rounding up the result value to the next integer and selecting the rounded up result value as an estimate of the number of frames comprised in the terminal buffer.

2. Method in a base station for computing a delay time parameter of data comprised in a buffer of a terminal, the base station and the terminal are comprised within a wireless communication system, the terminal buffer is arranged to comprise frames, and the frames comprise data, the method comprises the steps of:
determining a service requested by the terminal;
estimating an arrival time of the last frame of data to be received from the buffer of the terminal;
estimating a number of frames comprised in the buffer of the terminal;
establishing a frame interval according to the determined service; and
estimating the arrival time of the oldest frame in the terminal buffer by subtracting, from the estimate of the arrival time of the last frame of data, one established frame interval for each of the number of frames estimated to be comprised in the buffer of the terminal, additional to the oldest frame,
wherein the step of estimating the number of frames comprised in the buffer of the terminal, comprises:
estimating the number of frames generated by the terminal;
counting the number of frames received from the terminal;
subtracting the number of received frames from the estimate of the number of frames generated by the terminal to generate a result value; and
selecting the result value as an estimate of the number of frames comprised in the terminal buffer.

3. Method in a base station for computing a delay time parameter of data comprised in a buffer of a terminal, the base station and the terminal are comprised within a wireless communication system, the terminal buffer is arranged to comprise frames, and the frames comprise data, the method comprises the steps of:
determining a service requested by the terminal;
estimating an arrival time of the last frame of data to be received from the buffer of the terminal;
estimating a number of frames comprised in the buffer of the terminal;
establishing a frame interval according to the determined service;
estimating the arrival time of the oldest frame in the terminal buffer by subtracting, from the estimate of the arrival time of the last frame of data, one established frame interval for each of the number of frames estimated to be comprised in the buffer of the terminal, additional to the oldest frame; and
receiving a scheduling request from the terminal,
wherein the step of estimating the arrival time of the last frame of data to be received from the terminal comprises:
estimating when, in time, the terminal buffer was empty of data;
establishing a starting point in time based on a transmission time of the received scheduling request relative to the time when the terminal buffer was empty of data; and
for each frame interval that occurs, adding one of the frame intervals to the starting point.

4. Method in a base station for computing a delay time parameter of data comprised in a buffer of a terminal, the base station and the terminal are comprised within a wireless communication system, the terminal buffer is arranged to comprise frames, and the frames comprise data, the method comprises the steps of:
determining a service requested by the terminal;
estimating an arrival time of the last frame of data to be received from the buffer of the terminal;
estimating a number of frames comprised in the buffer of the terminal;
establishing a frame interval according to the determined service; and
estimating the arrival time of the oldest frame in the terminal buffer by subtracting, from the estimate of the arrival time of the last frame of data, one established frame interval for each of the number of frames estimated to be comprised in the buffer of the terminal, additional to the oldest frame,
wherein the step of estimating the arrival time within the established frame interval, of the last frame of data to be received from the terminal comprises:
sending a grant to the terminal at a first point in time;
receiving a transmission from the terminal;
determining if the received transmission comprises only padding or transmit data; when the received transmission only comprises padding, setting that point in time as a lower limit of a time interval within the frame interval if the lower limit of the time interval is not lower than a previously set lower limit of the time interval;
when the received transmission comprises transmit data, setting that point in time as a upper limit of a time interval within the frame interval if the upper limit of the time interval is not higher than a previously set upper limit of the time interval;
determining the arrival time of the last frame of data to be situated between the lower limit and the upper limit of the time interval
repeatedly sending a new grant to the terminal, at a displaced point in time relative to the first point in time.

* * * * *

UNITED STATES PATENT AND TRADEMARK OFFICE
CERTIFICATE OF CORRECTION

| | | |
|---|---|---|
| PATENT NO. | : 8,290,500 B2 | Page 1 of 1 |
| APPLICATION NO. | : 13/148361 | |
| DATED | : October 16, 2012 | |
| INVENTOR(S) | : Pettersson et al. | |

It is certified that error appears in the above-identified patent and that said Letters Patent is hereby corrected as shown below:

On the Title Page, in item (56), under "OTHER PUBLICATIONS", in Column 2, Line 4, delete "Networks" The" and insert -- Networks", The --, therefor.

In the Specification:

In Column 1, Line 5, below Title,
insert -- CROSS REFERENCE TO RELATED APPLICATION
This application is a 35 U.S.C. § 371 national stage application of PCT International Application No. PCT/SE2009/050131, filed on 9 February 2009, the disclosure and content of which is incorporated by reference herein in its entirety. The above-referenced PCT International Application was published in the English language as International Publication No. WO 2010/090566 A1 on 12 August 2010. --.

In Column 3, Lines 49-50, delete "Telecommunications" and insert -- Communications --, therefor.

In Column 3, Line 54, delete "Packet Data" and insert -- Packet --, therefor.

In Column 3, Line 55, delete "Data Access" and insert -- Access --, therefor.

In Column 3, Line 55, delete "(HDR)" and insert -- (HDR), --, therefor.

In Column 3, Line 56, delete "Data Access" and insert -- Access --, therefor.

In Column 6, Line 47, delete "FIG. 3B".

In Column 6, Line 57, delete "FIG. 3C".

Signed and Sealed this
Seventeenth Day of September, 2013

Teresa Stanek Rea
*Deputy Director of the United States Patent and Trademark Office*